United States Patent
Jeong et al.

(10) Patent No.: US 8,630,352 B2
(45) Date of Patent: Jan. 14, 2014

(54) SCALABLE VIDEO ENCODING/DECODING METHOD AND APPARATUS THEREOF WITH OVERRIDING WEIGHT VALUE IN BASE LAYER SKIP MODE

(75) Inventors: Se-Yoon Jeong, Daejeon (KR);
Gwang-Hoon Park, Seongnam (KR);
Min-Woo Park, Suwon (KR);
Seung-Pyo Shin, Wonju (KR);
Doug-Young Suh, Seongnam (KR);
Kyung-Ae Moon, Daejeon (KR);
Jin-Woo Hong, Daejeon (KR)

(73) Assignees: Electronics and Telecommunications Research Institute, Daejeon (KR);
Industry Academic Cooperation Foundation Kyunghee University, Geyeongi-do (KR)

(*) Notice: Subject to any disclaimer, the term of this patent is extended or adjusted under 35 U.S.C. 154(b) by 1048 days.

(21) Appl. No.: 12/305,420

(22) PCT Filed: Jul. 4, 2007

(86) PCT No.: PCT/KR2007/003256
§ 371 (c)(1),
(2), (4) Date: Dec. 18, 2008

(87) PCT Pub. No.: WO2008/004816
PCT Pub. Date: Jan. 10, 2008

(65) Prior Publication Data
US 2009/0175350 A1    Jul. 9, 2009

(30) Foreign Application Priority Data

Jul. 4, 2006   (KR) .................. 10-2006-0062611
Apr. 26, 2007  (KR) .................. 10-2007-0040969
Jul. 4, 2007   (KR) .................. 10-2007-0067031

(51) Int. Cl.
*H04N 7/26* (2006.01)

(52) U.S. Cl.
USPC ........................................ 375/240.24

(58) Field of Classification Search
USPC ................................ 375/240.01, 240.24
IPC ................................................. H04N 7/26
See application file for complete search history.

(56) References Cited

U.S. PATENT DOCUMENTS

| | | | |
|---|---|---|---|
| 2003/0215011 A1 | 11/2003 | Wang et al. | |
| 2006/0062299 A1 | 3/2006 | Park et al. | |
| 2006/0078053 A1 | 4/2006 | Park et al. | |
| 2007/0274388 A1* | 11/2007 | Lee et al. | 375/240.13 |
| 2009/0285299 A1* | 11/2009 | Chen et al. | 375/240.16 |
| 2010/0215103 A1* | 8/2010 | Yin et al. | 375/240.16 |
| 2010/0232506 A1* | 9/2010 | Yin et al. | 375/240.16 |

FOREIGN PATENT DOCUMENTS

WO    2006/006777 A1    1/2006

OTHER PUBLICATIONS

International Search Report—mailed Oct. 5, 2007—PCT/KR2007/003256.

* cited by examiner

*Primary Examiner* — Jay Patel
*Assistant Examiner* — Yulin Sun
(74) *Attorney, Agent, or Firm* — Ladas & Parry LLP

(57) ABSTRACT

Provided is a scalable video encoding method and apparatus, in which in adaptive reference fine grain scalability (AR-FGS) of scalable video coding, a weight value that is greater than a previous weight value provided for each slice overrides the previous weight value in order to generate a reference block for a enhancement layer when a macroblock mode of a base layer is a skip mode.

35 Claims, 14 Drawing Sheets

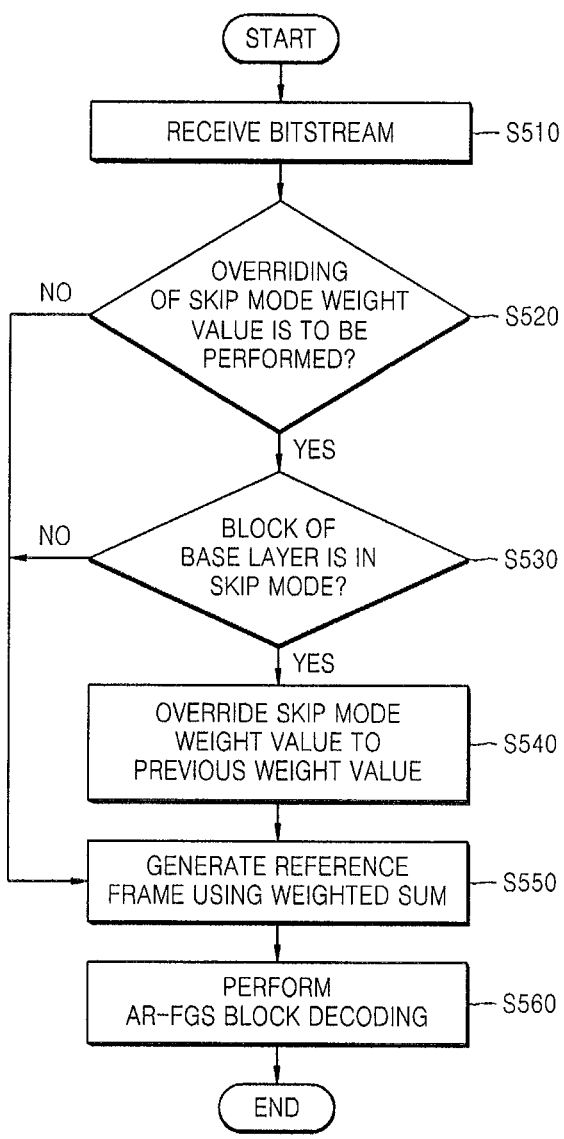

FIG. 6

| slice_header_in_scalable_extension( ) { | C | Descriptor |
|---|---|---|
| first_mb_in_slice | 2 | ue(v) |
| slice_type | 2 | ue(v) |
| ... | | |
| if( slice_type == PR && fragment_order == 0) { | | |
| adaptive_ref_fgs_flag | 2 | u(1) |
| if( adaptive_ref_fgs_flag ) { | | |
| max_diff_ref_scale_for_zero_base_block | 2 | u(5) |
| max_diff_ref_scale_for_zero_base_coeff | 2 | u(5) |
| override_max_diff_ref_scala_for_zero_base_block_flag | 2 | u(1) |
| if( override_max_diff_ref_scala_for_zero_base_block_flag ) | | |
| max_diff_ref_scale_for_skipped_base_block | 2 | u(2) |
| fgs_entropy_order_flag | 2 | u(1) |
| } | | |
| motion_refinement_flag | 2 | u(1) |
| } | | |
| ... | | |
| } | | |

FIG. 7

| slice_header_in_scalable_extension( ) { | C | Descriptor |
|---|---|---|
|   first_mb_in_slice | 2 | ue(v) |
|   slice_type | 2 | ue(v) |
|   ... | | |
|   if( slice_type == PR && fragment_order == 0) { | | |
|     adaptive_ref_fgs_flag | 2 | u(1) |
|     if( adaptive_ref_fgs_flag ) { | | |
|       max_diff_ref_scale_for_zero_base_block | 2 | u(5) |
|       max_diff_ref_scale_for_zero_base_coeff | 2 | u(5) |
|       max_diff_ref_scale_for_skipped_base_block | 2 | u(5) |
|       fgs_entropy_order_flag | 2 | u(1) |
|     } | | |
|     motion_refinement_flag | 2 | u(1) |
|   } | | |
|   ... | | |
| } | | |

FIG. 8

| slice_header_in_scalable_extension( ) { | C | Descriptor |
|---|---|---|
| first_mb_in_slice | 2 | ue(v) |
| slice_type | 2 | ue(v) |
| ... | | |
| if( slice_type == PR && fragment_order == 0) { | | |
| adaptive_ref_fgs_flag | 2 | u(1) |
| if( adaptive_ref_fgs_flag ) { | | |
| max_diff_ref_scale_for_zero_base_block | 2 | u(5) |
| max_diff_ref_scale_for_zero_base_coeff | 2 | u(5) |
| override_max_diff_ref_scale_for_skip_zero_base_block | 2 | ue(v) |
| fgs_entropy_order_flag | 2 | u(1) |
| } | | |
| motion_refinement_flag | 2 | u(1) |
| } | | |
| ... | | |
| } | | |

FIG. 9A

| slice_header_in_scalable_extension( ) { | C | Descriptor |
|---|---|---|
| first_mb_in_slice | 2 | ue(v) |
| slice_type | 2 | ue(v) |
| if( slice_type == PR ) { | | |
|    fragmented_flag | 2 | u(1) |
|    if( fragmented_flag == 1 ) { | | |
|      fragment_order | 2 | ue(v) |
|      if ( fragment_order != 0) | | |
|        last_fragment_flag | 2 | u(1) |
|    } | | |
|    if( fragment_order == 0 ) { | | |
|      num_mbs_in_slice_minus1 | 2 | ue(v) |
|      luma_chroma_sep_flag | 2 | u(1) |
|    } | | |
| } | | |
| if( slice_type != PR \|\| fragment_order == 0 ) { | | |
|    pic_parameter_set_id | 2 | ue(v) |
|    frame_num | 2 | u(v) |
|    if( !frame_mbs_only_flag ) { | | |
|      field_pic_flag | 2 | u(1) |
|      if( field_pic_flag ) | | |
|        bottom_field_flag | 2 | u(1) |
|    } | | |
|    if( nal_unit_type == 21 ) | | |
|      idr_pic_id | 2 | ue(v) |
|    if( pic_order_cnt_type == 0 ) { | | |
|      pic_order_cnt_lsb | 2 | u(v) |
|      if( pic_order_present_flag && !field_pic_flag ) | | |
|        delta_pic_order_cnt_bottom | 2 | se(v) |
|    } | | |
|    if( pic_order_cnt_type == 1 && !delta_pic_order_always_zero_flag ) { | | |
|      delta_pic_order_cnt[ 0 ] | 2 | se(v) |
|      if( pic_order_present_flag && !field_pic_flag ) | | |
|        delta_pic_order_cnt[ 1 ] | 2 | se(v) |
|    } | | |
| } | | |
| if( nal_ref_idc != 0 ) | | |
|    key_pic_flag | 2 | u(1) |

FIG. 9B

| | | |
|---|---|---|
| if( slice_type != PR ) { | | |
|   if( redundant_pic_cnt_present_flag ) | | |
|     redundant_pic_cnt | 2 | ue(v) |
|   if( slice_type == EB ) | | |
|     direct_spatial_mv_pred_flag | 2 | u(1) |
|   base_id_plus1 | 2 | ue(v) |
|   if( base_id_plus1 != 0 ) { | | |
|     adaptive_prediction_flag | 2 | u(1) |
|   } | | |
|   if( slice_type == EP \|\| slice_type == EB ) { | | |
|     num_ref_idx_active_override_flag | 2 | u(1) |
|     if( num_ref_idx_active_override_flag ) { | | |
|       num_ref_idx_l0_active_minus1 | 2 | ue(v) |
|       if( slice_type == EB ) | | |
|         num_ref_idx_l1_active_minus1 | 2 | ue(v) |
|     } | | |
|   } | | |
|   ref_pic_list_reordering( ) | 2 | |
|   if ( ( weighted_pred_flag && slice_type == EP ) \|\|<br>    ( weighted_bipred_idc == 1 && slice_type == EB ) ) { | | |
|     if( adaptive_prediction_flag) | | |
|       base_pred_weight_table_flag | 2 | u(1) |
|     if( base_pred_weight_table_flag == 0 ) | | |
|       pred_weight_table( ) | | |
|   } | | |
|   if( nal_ref_idc != 0 ) { | | |
|     dec_ref_pic_marking( ) | 2 | |
|     if ( key_pic_flag && nal_unit_type != 21 ) | | |
|       dec_ref_pic_marking_base( ) | | |
|   } | | |
|   if( entropy_coding_mode_flag && slice_type != EI ) | | |
|     cabac_init_idc | 2 | ue(v) |
| } | | |
| if( slice_type != PR \|\| fragment_order == 0 ) { | | |
|   slice_qp_delta | 2 | se(v) |
|   if( deblocking_filter_control_present_flag ) { | | |
|     disable_deblocking_filter_idc | 2 | ue(v) |

FIG. 9C

| | | |
|---|---|---|
| if( disable_deblocking_filter_idc != 1 ) { | | |
| slice_alpha_c0_offset_div2 | 2 | se(v) |
| slice_beta_offset_div2 | 2 | se(v) |
| } | | |
| } | | |
| } | | |
| if( slice_type != PR ) | | |
| if( num_slice_groups_minus1 > 0 &&    slice_group_map_type >= 3 && slice_group_map_type <= 5) | | |
| slice_group_change_cycle | 2 | u(v) |
| if( slice_type != PR && extended_spatial_scalability > 0 ) { | | |
| if ( chroma_format_idc > 0 ) { | | |
| base_chroma_phase_x_plus1 | 2 | u(2) |
| base_chroma_phase_y_plus1 | 2 | u(2) |
| } | | |
| if( extended_spatial_scalability == 2 ) { | | |
| scaled_base_left_offset | 2 | se(v) |
| scaled_base_top_offset | 2 | se(v) |
| scaled_base_right_offset | 2 | se(v) |
| scaled_base_bottom_offset | 2 | se(v) |
| } | | |
| } | | |
| if( slice_type == PR && fragment_order == 0) { | | |
| adaptive_ref_fgs_flag | 2 | u(1) |
| if( adaptive_ref_fgs_flag ) { | | |
| max_diff_ref_scale_for_zero_base_block | 2 | u(5) |
| max_diff_ref_scale_for_zero_base_coeff | 2 | u(5) |
| override_max_diff_ref_scale_for_zero_base_block_flag | 2 | u(1) |
| if( override_max_diff_ref_scale_for_zero_base_block_flag ) | | |
| max_diff_ref_scale_for_skipped_base_block | 2 | u(2) |
| fgs_entropy_order_flag | 2 | u(1) |
| } | | |
| motion_refinement_flag | 2 | u(1) |
| } | | |
| SpatialScalabilityType = spatial_scalability_type( ) | | |
| } | | |

SCALABLE VIDEO ENCODING/DECODING METHOD AND APPARATUS THEREOF WITH OVERRIDING WEIGHT VALUE IN BASE LAYER SKIP MODE

TECHNICAL FIELD

The present invention relates to a scalable video encoding/decoding method and apparatus, and more particularly, to a scalable video encoding/decoding method and apparatus, in which, in adaptive reference fine grain scalability (AR-FGS), when a macroblock mode of a base layer is a skip block, a weight value of a macroblock in an enhancement layer is overridden by a skip-mode weight value that is greater than a previous weight value in order to generate a reference block, thereby improving coding efficiency.

BACKGROUND ART

In scalable video coding (SVC) that has been standardized by the Joint Video Team (JVT) of the Moving Picture Experts Group (MPEG) and the International Telecommunication Union-Telecommunication Standardization Sector (ITU-T), adaptive reference fine grain scalability (AR-FGS) is a technique for improving coding efficiency by performing temporal prediction in fine grain scalability (FGS) coding of signal-to-noise ratio (SNR) scalability.

SNR scalable techniques improve display quality in proportion to a received bitrate according to variable network conditions. FGS is a representative SNR scalable technique, and is used to receive a bitstream that is cut according to network conditions and to improve display quality in proportion to the amount of bitstream transmitted. However, FGS cannot know a bitrate to be received and thus cannot have a temporal prediction scheme that produces high coding efficiency improvement in a video codec. If a temporal prediction scheme is used in FGS with no regard for such a characteristic of FGS, drift occurs due to a mismatch between reference images for motion compensation in an encoder and a decoder, resulting in sharp performance degradation in terms of a reproduced image and coding efficiency.

Adaptive reference fine grain scalability (AR-FGS) exploits both efficient drift control and improvement in the performance of a temporal prediction scheme. AR-FGS generates a reference block or a reference macroblock for motion compensation using a weighted sum of reference blocks obtained in partially decoded upper layer and lower layer. Using an AR-FGS method implemented in this way, FGS coding performance can be improved and drift can be controlled.

FIG. 1 is a conceptual diagram illustrating generation of a reference block in AR-FGS according to the prior art.

Referring to FIG. 1, the size of a block is M×N and $X^n$ is a signal of a block to be coded in an FGS layer (enhancement layer). $R_a^n$ is a signal of a motion compensation reference block generated by a weighted sum of a base layer and the enhancement layer. A signal of a reference block in the enhancement layer is indicated by $R_e^{n-1}$ and a quantized coefficient of the base layer is indicated by $Q_b^n$ and transformation is indicated by $F_X = f(X)$. A quantized transformation coefficient of the base layer is indicated by $Q_b^n(u,v)$.

In AR-FGS, a reference block is generated in the following two ways.

1. If quantized coefficients in a base layer are all 0, a reference block is generated by a weighted sum of a counterpart block in the base layer and a counterpart block in an enhancement layer using $\alpha$ as a weight value for the enhancement layer and $1-\alpha$ as a weight value for the base layer, as follows:

$$R_a^n = (1-\alpha) \cdot X^n + \alpha \cdot R_e^{n-1} \text{ if } Q_b^n = 0 \quad (1)$$

2. In the other cases in which at least one quantized coefficient in the base layer is not 0, a reference block is generated in a transformation coefficient domain. If a transformation coefficient of the transformation coefficient domain in a position corresponding to the base layer is 0, a transformation coefficient corresponding to the base layer is multiplied by $1-\beta 1$ and a transformation coefficient corresponding to the enhancement layer is multiplied by $\beta$ in the transformation coefficient domain, thereby obtaining a sum of the multiplication results as a transformation coefficient as in Equation 2. If a transformation coefficient of the transformation coefficient domain in a position corresponding to the base layer is not 0, a signal of the base layer is used as in Equation 3. A reference block is generated by inverse transformation with respect to the obtained transformation coefficient.

$$F_{R_a^n}(u,v) = (1-\beta) \cdot F_{X_b^n}(u,v) + \beta \cdot F_{R_e^{n-1}}(u,v) \text{ if } Q_b^n(u,v) = 0 \quad (2)$$

$$F_{R_a^n}(u,v) = F_{X_b^n}(u,V) \text{ if } Q_b^n(u,v) \neq 0 \quad (3)$$

Weight values are provided for each slice, and a weight value $\alpha$ for a case where values of residues of all pixels in a block of a base layer are all '0' and a weight value $\beta$ for a case where some values of residues of all pixels in a block of a base layer are not '0' and thus some transformation coefficients obtained by transformation into a discrete cosine transformation (DCT) domain are not '0' are separately transmitted. The weight values $(\alpha, \beta)$ are weight values of an upper layer and range between 0 and 1. Weight values of a lower layer are $(1-\alpha, 1-\beta)$.

FGS coding is performed using the generated reference block by exploiting the advantage of a temporal prediction scheme. When compared to conventional FGS coding, such FGS coding exhibits improved performance in real-time based video coding as well as general video coding.

Video coding techniques such as the MPEG-4 standard and the H.264 standard use various prediction schemes. Among these prediction schemes, a skip mode is a mode in which block data of a base layer does not exist and data of a reference picture is used, i.e., there is no temporal data change. Thus, performance improvement may be expected using data of a reference picture on the assumption that there may be no data change in an enhancement layer. Even if transmission is not performed, drift is not likely to occur due to incorrect reference in a skip-mode block.

DESCRIPTION OF THE DRAWINGS

FIG. 5 is a flowchart illustrating a scalable video decoding method according to another exemplary embodiment of the present invention.

FIG. 6 illustrates a syntax for expressing a scalable video encoding method according to a first exemplary embodiment of the present invention.

FIG. 7 illustrates a syntax for expressing a scalable video encoding method according to a second exemplary embodiment of the present invention.

FIG. 8 illustrates a syntax for expressing a scalable video encoding method according to a third exemplary embodiment of the present invention.

FIGS. 9A to 9C illustrate the syntax of a slice header in scalable extension including a syntax for expressing a scalable video encoding method according to an exemplary embodiment of the present invention.

DETAILED DESCRIPTION OF THE INVENTION

Technical Problem

Figure 1:
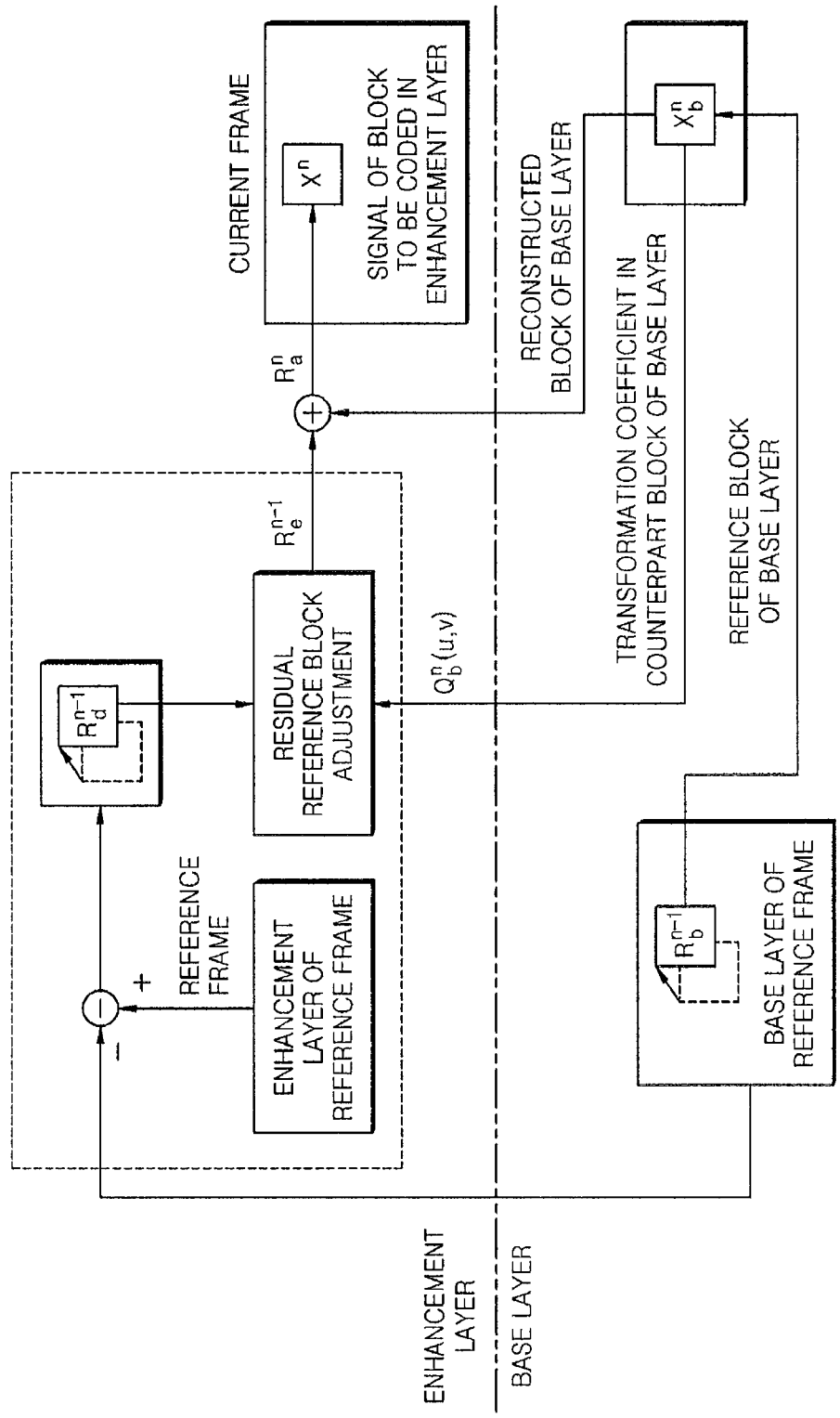
FIG. 1 is a conceptual diagram illustrating a method of generating a reference block in adaptive reference-fine grain scalability (AR-FGS) according to the prior art.

The present invention provides a scalable video coding method and apparatus to improve coding performance and reduce the probability of drift when video data of a macroblock of a base layer is in a skip mode.

Technical Solution

According to one aspect of the present invention, there is provided a scalable video encoding method including determining whether a block of a base layer, which corresponds to a block of an enhancement layer of a current frame to be encoded, is in a skip mode, overriding a previous weight value that has been set for a block of an enhancement layer of a reference frame with a new weight value, the block of the enhancement layer of the reference frame corresponding to the block of the enhancement layer of the current frame, if the block of the base layer is in the skip mode, and generating a reference block for the block of the enhancement layer of the current frame based on the block of the enhancement layer of the reference frame and the block of the base layer of the current frame using the new weight value.

Advantageous Effects

According to the present invention, when video data of a macroblock of a base layer of the current frame is in a skip mode, a skip-mode weight value that is greater than a previous weight value provided for each slice in a counterpart block of an enhancement layer of a reference frame overrides the previous weight value when a reference block for an enhancement layer of the current frame is generated, thereby improving scalable video coding efficiency.

Moreover, it is possible to reduce the probability of drift due to a mismatch between reference images for motion compensation in an encoder and a decoder, when compared to the use of a temporal prediction scheme irrespective of whether the macroblock of the base layer is in the skip mode.

Best Mode

According to one aspect of the present invention, there is provided a scalable video encoding method including determining whether a block of a base layer, which corresponds to a block of an enhancement layer of a current frame to be encoded, is in a skip mode, overriding a previous weight value that has been set for a block of an enhancement layer of a reference frame with a new weight value, the block of the enhancement layer of the reference frame corresponding to the block of the enhancement layer of the current frame, if the block of the base layer is in the skip mode, and generating a reference block for the block of the enhancement layer of the current frame based on the block of the enhancement layer of the reference frame and the block of the base layer of the current frame using the new weight value.

According to another aspect of the present invention, there is provided a scalable video decoding method including determining whether a block of a base layer, which corresponds to a block of an enhancement layer of a current frame to be decoded, is in a skip mode, overriding a previous weight value that has been set for a block of an enhancement layer of a reference frame with a new weight value, the block of the enhancement layer of the reference frame corresponding to the block of the enhancement layer of the current frame, if the block of the base layer is in the skip mode, and generating a reference block for the block of the enhancement layer of the current frame based on the block of the enhancement layer of the reference frame and the block of the base layer of the current frame using the new weight value.

According to another aspect of the present invention, there is provided a scalable video encoding apparatus including a mode determination unit, a weight value overriding unit, and a reference block generation unit. The mode determination unit determines whether a block of a base layer, which corresponds to a block of an enhancement layer of a current frame to be encoded, is in a skip mode. The weight value overriding unit overrides a previous weight value that has been set for a block of an enhancement layer of a reference frame with a new weight value, the block of the enhancement layer of the reference frame corresponding to the block of the enhancement layer of the current frame, if the block of the base layer is in the skip mode. The reference block generation unit generates a reference block for the block of the enhancement layer of the current frame based on the block of the enhancement layer of the reference frame and the block of the base layer of the current frame using the new weight value.

According to another aspect of the present invention, there is provided a scalable video decoding apparatus including a mode determination unit, a weight value overriding unit, and a reference block generation unit. The mode determination unit determines whether a block of a base layer, which corresponds to a block of an enhancement layer of a current frame to be decoded, is in a skip mode; the weight value overriding unit overrides a previous weight value that has been set for a block of an enhancement layer of a reference frame with a new weight value, the block of the enhancement layer of the reference frame corresponding to the block of the enhancement layer of the current frame, if the block of the base layer is in the skip mode; and the reference block generation unit generates a reference block for the block of the enhancement layer of the current frame based on the block of the enhancement layer of the reference frame and the block of the base layer of the current frame using the new weight value.

According to another aspect of the present invention, there is provided a computer-readable recording medium having embodied thereon a program for executing the scalable video encoding method and the scalable video decoding method.

MODE OF THE INVENTION

Hereinafter, exemplary embodiments of the present invention will be described in detail with reference to the accompanying drawings. It should be noted that like reference numerals refer to like elements illustrated in one or more of the drawings. In the following description of the present invention, a detailed description of known functions and configurations incorporated herein will be omitted for conciseness and clarity.

In the following description, the terms "picture" and "frame" indicate video data in a video sequence and are interchangeable.

Figure 2:
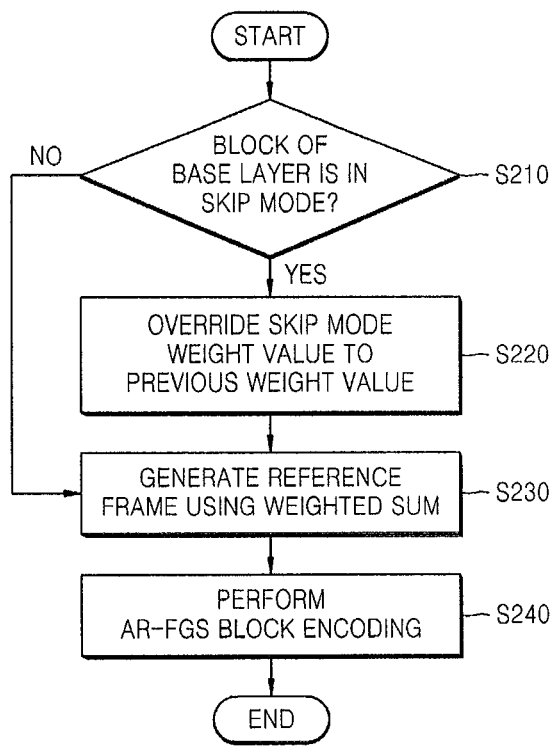
FIG. 2 is a flowchart illustrating a scalable video encoding method according to an exemplary embodiment of the present invention.

FIG. 2 is a flowchart illustrating a scalable video encoding method according to an exemplary embodiment of the present invention.

Referring to FIG. 2, a scalable video encoding apparatus according to an exemplary embodiment of the present invention determines whether a mode of a block of a base layer of a current frame to be encoded, which corresponds to a block of an enhancement layer of the current frame to be encoded, is a skip mode in operation S210. The skip mode is a mode in which a block of a base layer of the current frame uses block data of a base layer of a reference frame without transmission of additional data of the base layer and there is no temporal data change. Thus, the scalable video encoding apparatus can determine whether the mode of the counterpart block of the base layer of the current frame is the skip mode by comparing the counterpart block of the base layer of the current frame with a counterpart block of the base layer of the reference frame and determining whether block data of the current frame is the same as block data of the reference frame in the temporal direction. If the mode of the block of the base layer of the current frame is the skip mode, the scalable video encoding apparatus overrides a previous weight value that has been set for a block of the enhancement layer of the reference frame with a new weight value which will hereinafter be referred to as a 'skip-mode weight value', in operation S220. By setting the skip-mode weight value greater than a previous weight value set for each slice, the rate of the use of data of an enhancement layer can increase, leading to improvement in coding efficiency. The skip-mode weight value can be transmitted with the previous weight value after being coded in a slice header. A decoder then checks a mode for each block, uses the skip-mode weight value only for a skip-mode block, and uses the previous weight value for blocks other than the skip-mode block, thereby generating a reference block.

The scalable video encoding apparatus generates a reference block for the block of the enhancement layer of the current frame to be encoded using a weighted sum in operation S230. If a block mode of the base layer of the current frame is the skip mode, the scalable video encoding apparatus generates the reference block by means of a weighted sum of a counterpart block of an enhancement layer of the reference frame to which the skip-mode weight value is applied and the block of the base layer of the current frame to which a weight value calculated from the skip-mode weight value is applied. If the block mode of the base layer of the current frame is not the skip mode, the scalable video encoding apparatus generates the reference block by means of a weighted sum of the counterpart block of the enhancement layer of the reference frame and the block of the base layer of the current frame by using the previous weight value.

In operation S240, AR-FGS block encoding is performed on the block of the enhancement layer of the current frame based on the generated reference block.

Figure 3:
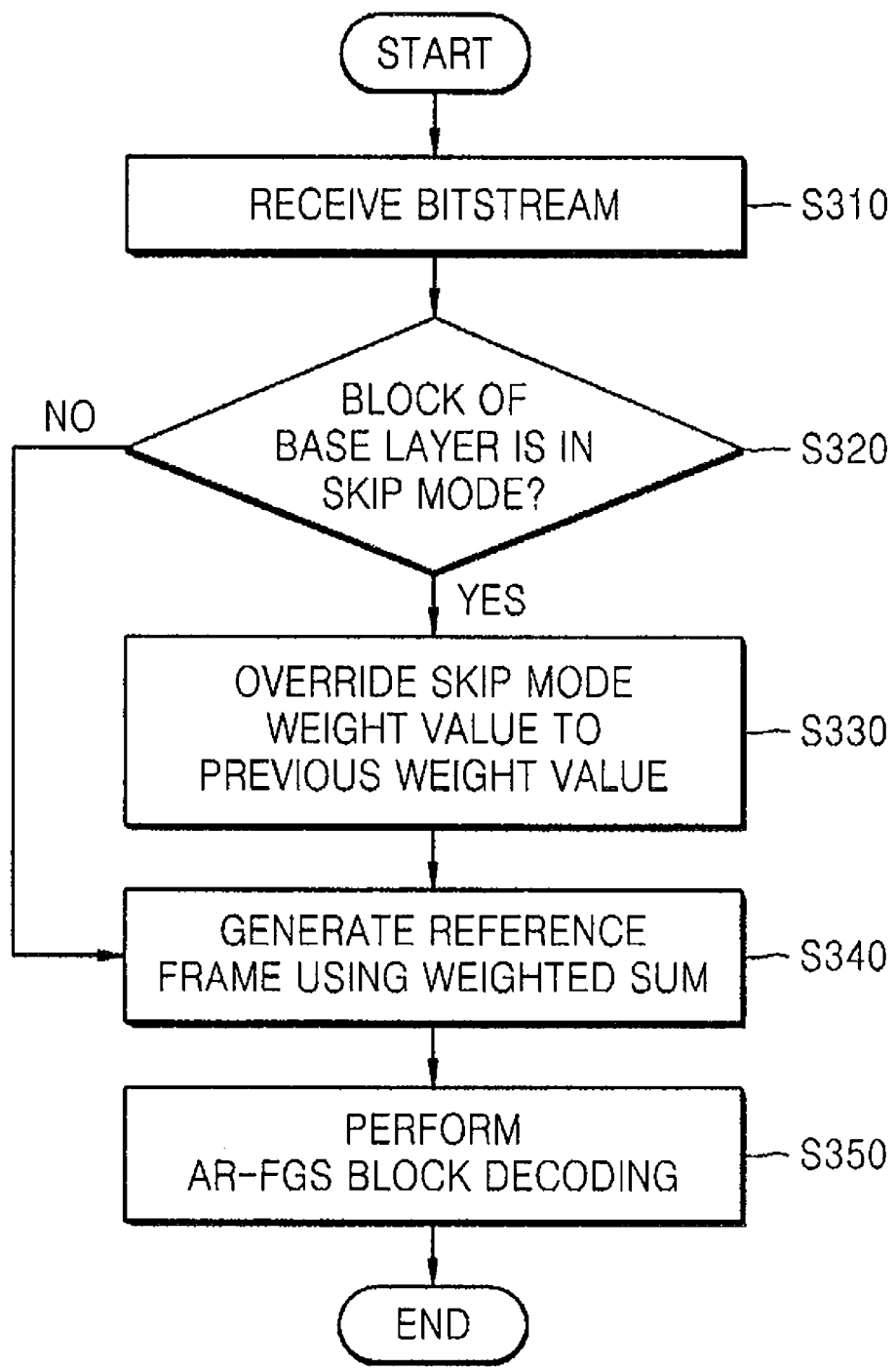
FIG. 3 is a flowchart illustrating a scalable video decoding method according to an exemplary embodiment of the present invention.

FIG. 3 is a flowchart illustrating a scalable video decoding method according to an exemplary embodiment of the present invention.

Referring to FIG. 3, a scalable video decoding apparatus according to an exemplary embodiment of the present invention receives an encoded bitstream from a scalable video encoding apparatus in operation S310. The received bitstream may include a block that has been encoded in the skip mode, skip-mode information, and skip-mode weight value information for reference block generation.

The scalable video decoding apparatus determines whether a block mode of a base layer corresponding to a block of an enhancement layer of the current frame to be decoded in the received bitstream is a skip mode in operation S320. The determination of whether the block mode is the skip mode can be performed by referring to the skip-mode information included in the received bitstream, e.g., information indicating that a block has no data, information, such as a specific syntax element like a skip flag, indicating a block is in a skip mode, and the like.

If the block mode of the base layer of the current frame is the skip mode, the scalable video decoding apparatus overrides a previous weight value that has been set for a block of an enhancement layer of the reference frame with a skip-mode weight value in operation S330. More specifically, if the block mode of the base layer is the skip mode, the scalable video decoding apparatus extracts the skip-mode weight value included in the received bitstream and overrides the previous weight value set for the block of the enhancement layer of the reference frame with the extracted skip-mode weight value. The skip-mode weight value may be extracted from a slice header included in the bitstream.

The scalable video decoding apparatus generates a reference block for the block of the enhancement layer of the current frame to be decoded using a weighted sum in operation S340. If the scalable video decoding apparatus determines that the block of the base layer of the current frame is in the skip mode, it generates the reference block by means of a weighted sum of a counterpart block of the enhancement layer of the reference frame to which the skip-mode weight value is applied and the counterpart block of the base layer of the current frame to which a weight value calculated from the skip-mode weight value is applied. If the scalable video decoding apparatus determines that the block of the base layer of the current frame is not in the skip mode, it generates the reference block by means of a weighted sum of the counterpart block of the enhancement layer of the reference frame and the counterpart block of the base layer of the current frame using the previous weight value.

The scalable video decoding apparatus performs AR-FGS block decoding on the block of the enhancement layer of the current frame based on the generated reference block in operation S350.

Figure 4:
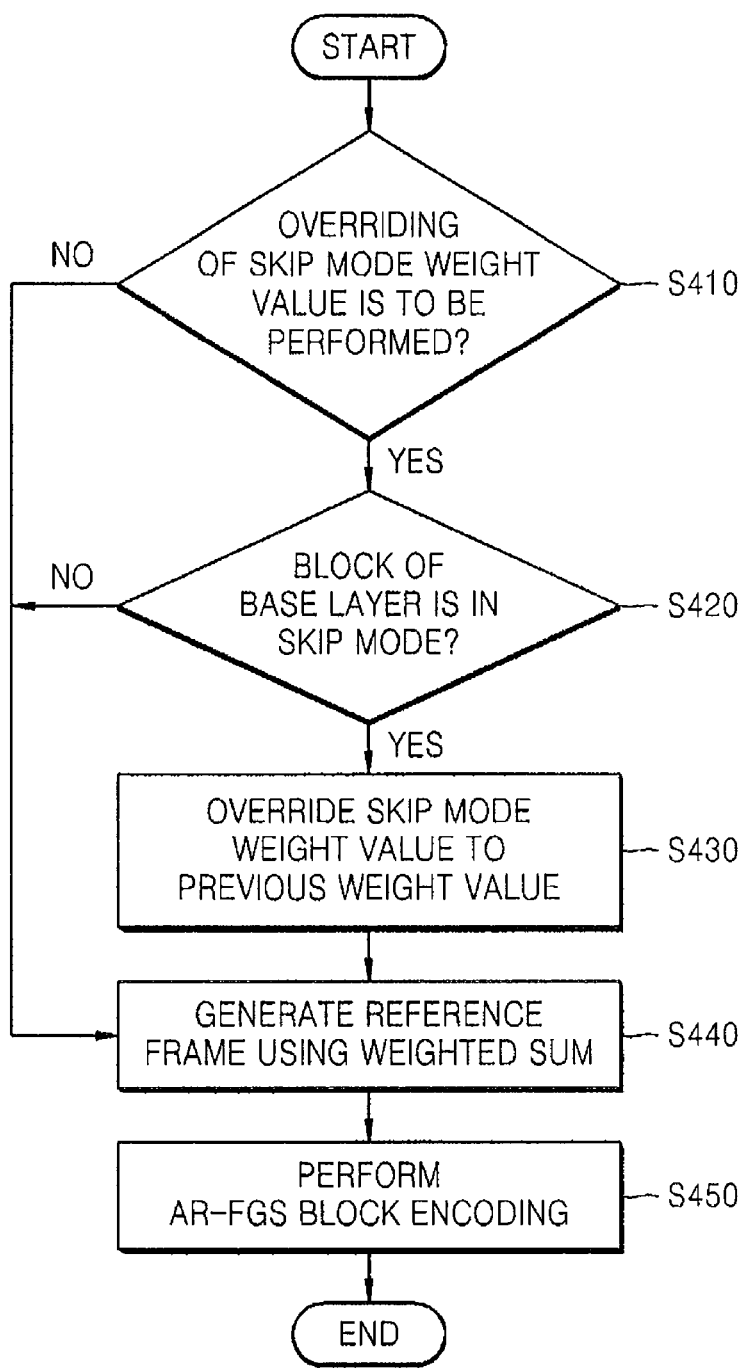
FIG. 4 is a flowchart illustrating a scalable video encoding method according to another exemplary embodiment of the present invention.

FIG. 4 is a flowchart illustrating a scalable video encoding method according to another exemplary embodiment of the present invention. In the following description of the scalable video encoding method of FIG. 4, description similar to that of the method of FIG. 2 will be omitted.

Referring to FIG. 4, the scalable video encoding apparatus determines whether to set a flag indicating overriding of a previous weight value with a skip-mode weight value, which will hereinafter be referred to as an overriding flag, in operation S410.

If the overriding flag is set to '1', the scalable video encoding apparatus determines whether a block mode of a base layer of the current frame is a skip mode in operation S420.

If so, the scalable video encoding apparatus overrides a previous weight value with the skip-mode weight value in operation S430.

The scalable video encoding apparatus generates a reference block for a block of an enhancement layer of the current frame using a weighted sum in operation S440. More specifically, if the overriding flag is set to '1' and the block of the base layer is determined to be in the skip mode, the scalable video encoding apparatus generates the reference block by means of a weighted sum of a counterpart block of an enhancement layer of a reference frame to which the skip-mode weight value is applied and the block of the base layer of the current frame to which a weight value calculated from the skip-mode weight value is applied. If the overriding flag is not set to '1' or the block mode of the base layer of the current frame is not the skip mode, the scalable video encoding apparatus generates the reference block by means of a weighted sum of the counterpart block of the enhancement layer of the reference frame and the block of the base layer of the current frame using the previous weight value.

The scalable video encoding apparatus performs AR-FGS block encoding on the enhancement layer of the current frame based on the generated reference block in operation S450.

FIG. 5 is a flowchart illustrating a scalable video decoding method according to another exemplary embodiment of the present invention. In the following description of the scalable video decoding method of FIG. 5, description similar to that of the method of FIG. 3 will be omitted.

Referring to FIG. 5, a scalable video decoding apparatus receives a bitstream including a block that has been encoded in the skip mode from a scalable video encoding apparatus in operation S510.

The scalable video decoding apparatus determines whether a flag indicating overriding of a previous weight value with a skip-mode weight value, which will hereinafter be referred to as an overriding flag, has been set in operation S520. The received bitstream may include the block that has been encoded in the skip mode, information indicating whether the skip mode has been implemented, skip-mode information, and a skip-mode weight value for reference block generation.

If the overriding flag is set to '1', the scalable video decoding apparatus determines whether a mode of a block of a base layer of the current frame is a skip mode in operation S530.

If the block of the base layer is in the skip mode, the scalable video decoding apparatus overrides a previous weight value that has been set for a block of an enhancement layer of a reference frame with the skip-mode weight value in operation S540.

The scalable video decoding apparatus generates a reference block for a block of an enhancement layer of the current frame to be decoded using a weighted sum in operation S550. More specifically, if the overriding flag is set to '1' and the block of the base layer is in the skip mode, the scalable video decoding apparatus generates the reference block by means of a weighted sum of a counterpart block of an enhancement layer of the reference frame to which the skip-mode weight value is applied and the block of the base layer of the current frame to which a weight value calculated from the skip-mode weight value is applied. If the overriding flag is not set to '1' or the block mode of the base layer of the current frame is not the skip mode, the scalable video decoding apparatus generates the reference block by means of a weighted sum of the counterpart block of the enhancement layer of the reference frame and the block of the base layer of the current frame using the previous weight value.

The scalable video decoding apparatus performs AR-FGS block decoding on the enhancement layer of the current frame based on the generated reference block in operation S560.

While the block mode of the base layer is the skip mode in FIGS. 2 through 5, it can be easily understood by those of ordinary skill in the art that a previous weight value may be overridden with a new weight value when a block of a base layer of the current frame is within a specific range from a value that is predicted from reference pictures, i.e., blocks located to the left of, to the left of and above, and above the block of the base layer of the current frame according to the H.264 standard, as well as when the block of the base layer of the current frame is in the skip mode.

The skip-mode weight value used for overriding can be coded into a slice header using n-bit fixed-length coding or variable length coding.

FIG. 6 illustrates a syntax for expressing a scalable video encoding method according to a first exemplary embodiment of the present invention.

Referring to FIG. 6, scalable video coding is performed in the syntax of a slice header in scalable extension. Thus, a flag "override_max_diff_ref_scale_for_zero_base_block_flag" indicating whether to override with a skip-mode weight value is coded. If the flag is '1', skip-mode weight value overriding information "max_diff_ref_scale_for_skipped_base_block" is coded using 2 bits. If the flag is '0', "max_diff_ref_scale_for_skipped_base_block" is not coded.

The skip-mode weight value overriding information "max_diff_ref_scale_for_skipped_base_block" ranges between 0 and 3. For skip-mode weight value overriding information of 0, a weight value for an enhancement layer is set to 32/32, the weight value is set to 31/32 for 1, the weight value is set to 30/32 for 2, and the weight value is set to 29/32 for 3. In order to code a block of an enhancement layer with respect to the skip-mode block of the base layer, if "override_max_diff_ref_scale_for_zero_base_block_flag" is 1, a skip-mode weight value "max_diff_ref_scale_for_skipped_base_block" overrides "max_diff_ref_scale_for_zero_base_block".

FIG. 7 illustrates a syntax for expressing a scalable video encoding method according to a second exemplary embodiment of the present invention.

Referring to FIG. 7, scalable video coding is performed in the syntax of a slice header in scalable extension and skip-mode weight value overriding information "max_diff_ref_scale_for_skipped_base_block" is coded using 5 bits.

FIG. 8 illustrates a syntax for expressing a scalable video encoding method according to a third exemplary embodiment of the present invention.

Referring to FIG. 8, scalable video coding is performed in the syntax of a slice header in scalable extension and skip-mode weight value overriding information "max_diff_ref_scale_for_skipped_base_block" is coded using a variable-length code, e.g., an Exp-Golomb code used in H.264.

A pseudo code that is applied in scalable video coding standardization is as follows:

```
If(mb_type==P_Skip&&override_max_diff_ref_scale_for_zero_base_block_flag==1){
    max_diff_ref_scale_for_zero_base_block=max_diff_ref_scale_for_skipped_base_block
}
```

FIGS. 9A to 9C illustrate the syntax of a slice header in scalable extension including a syntax for expressing a scalable video encoding method according to an exemplary embodiment of the present invention.

Referring to FIGS. 9A to 9C, the pseudo code is used as a syntax according to the scalable video coding international standard and semantics of parameters used in FIGS. 9A to 9C are as follows:
override_max_diff_ref_scale_for_zero_base_block_flag equal to 1 specifies that max_diff_ref_scale_for_skipped_base_block presence in the progressive slice of a key picture. max_diff_ref_scale_for_skipped_base_block specifies the maximum scaling factor to be used for scaling the differential reference signal in constructing the inter prediction samples used in decoding the progressive slice of a key picture, when the transform block in the base layer is skipped. The value of max_diff_ref_scale_for_skipped_base_block shall be in the range of 0 to 3, inclusive.

A variable MaxDIffRefScaleSkippedBaseBlock is derived as follows.

The variable MaxDIffRefScaleSkippedBaseBlock is set equal to max_diff_ref_scale_for_skipped_base_block.

The following shows embodiments of a decoding process with respect to the pseudo code, i.e., a scaling process for differential interprediction samples of 4×4 luma blocks, a scaling process for differential interprediction samples for 8×8 luma blocks, and a scaling process for differential interprediction samples for chroma blocks.

Scaling Process for Differential Interprediction Samples of 4×4 Luma Blocks

--- if numBaseSig is equal to 0, the following applies.
    A scaling factor sF is derived as follows.
        If mb_type is equal to P_Skip and
        override_max_diff_ref_scale_for_zero_base_block_flag is equal to 1, sF is set
        equal to MaxDiffRefScaleSkippedBlock.
    Else If ctx4×4Id is equal to 0, sF is set equal to MaxDiffRefScaleZeroBaseBlock.
    Otherwise (ctx4×4Id is not equal to 0), sF is set equal to
    max( 0,MaxDiffRefScaleZeroBaseBlock−4).
The 4×4 array diffPred4×4 of differential luma prediction samples is modified by
    diffPred4×4[ x,y]=(sF*diffPred4×4[ x,y] + 16) >> 5 with x,y=0...3

---

Scaling Process for Differential Interprediction Samples of 8×8 Luma Blocks

Let numBaseSig be the number of values equal to 1 inside the 8×8 array sBC.

Depending on numBaseSig the following applies.

---

If numBaseSig is equal to 0, the following applies.
    A scaling factor sF is derived as follows.
        If mb_type is equal to P_Skip and
        override_max_diff_ref_scale_for_zero_base_block_flag is equal to 1, sF is
        set equal to MaxDiffRefScaleSkippedBlock.
        Otherwise sF is set equal to MaxDiffRefScaleZeroBaseBlock.
The 8×8 array diffPred8×8 of differential luma prediction samples is modified by
    diffPred8×8[ x,y]=(sF*diffPred8×8[ x,y] + 16) >> 5 with x,y=0...7

---

Scaling Process for Differential Interprediction Samples of Chroma Blocks

Let numBaseSigDC be the number of values diffPred4×4 [chroma4×4Blkldx][0,0] that are equal to 1 for chroma4×4Blkldx=0 ... numChroma4×4Blks−1.

Depending on numBaseSigDC the following applies.

---

If numBaseSigDC is equal to 0, for each 4×4 chroma block with
chroma4×4BlkIdx=0..numChroma4×4Blks-1 the following applies.
    Let numBaseSigAC be the number of values equal to 1 inside the 4×4 array
    sBC[chroma4×4BlkIdx].
        Depending on numBaseSigAC the following applies.
        If numBaseSigAC is equal to 0, the following applies.
            A scaling factor sF is derived as follows.
                If mb_type is equal to P_Skip and
                override_max_diff_ref_scale_for_zero_base_block_flag is equal to 1, sF is
                set equal to MaxDiffRefScaleSkippedBlock.
            Otherwise sF is set equal to MaxDiffRefScaleZeroBaseBlock.
    The 4×4 array diffPred4×4[chroma4×4BlkIdx ] is modified by
        diffPred4×4[chroma4×4BlkIdx ][ x,y]=
            (sF*diffPred4×4[chroma4×4BlkIdx ][ x,y] + 16) >> 5 with x,y=0...3

Figure 10:
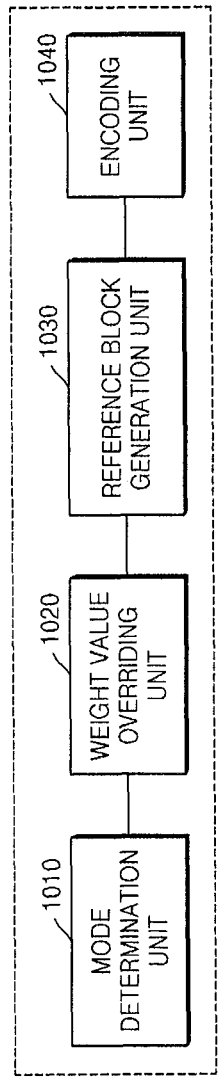
FIG. 10 is a block diagram schematically illustrating the internal structure of a scalable video encoding apparatus according to an exemplary embodiment of the present invention.

FIG. 10 is a block diagram schematically illustrating the internal structure of a scalable video encoding apparatus according to an exemplary embodiment of the present invention. In the following description of FIG. 10, description similar to that of previous embodiments will be omitted.

Referring to FIG. 10, the scalable video encoding apparatus according to the current embodiment of the present invention includes a mode determination unit 1010, a weight value overriding unit 1020, a reference block generation unit 1030, and an encoding unit 1040.

The mode determination unit 1010 determines whether a counterpart block of a base layer of a current frame to be encoded, which corresponds to a block of an enhancement layer of the current frame, is in a skip mode. The mode determination unit 1010 also determines whether to set a flag indicating overriding of a previous weight value with a skip-mode weight value, which will hereinafter be referred to as an overriding flag. The mode determination unit 1010 determines whether the counterpart block of the base layer is in the skip mode if it sets the overriding flag to '1', and does not determines whether the counterpart block of the base layer is in the skip mode if it does not set the overriding flag.

If the block of the base layer of the current frame is in the skip mode, the weight value overriding unit 1020 overrides a previous weight value that has been set for a block of an enhancement layer of a reference frame with a skip-mode weight value set greater than the previous weight value, the block of the enhancement layer of the reference frame corresponding to the block of the enhancement layer of the current frame.

The reference block generation unit 1030 generates a reference block based on a weight value set for the block of the enhancement layer of the reference frame. If the mode determination unit 1010 sets the overriding flag to '1' and determines that the block of the base layer of the current frame is in the skip mode, the reference block generation unit 1030 generates the reference block by means of a weighted sum of a block of the enhancement layer of the reference frame to which a new weight value is applied and the block of the base layer of the current frame to which a weight value calculated from the new weight value is applied. If the mode determination unit 1010 determines that the block of the base layer of the current frame is not in the skip mode, the reference block generation unit 1030 generates the reference block by means of a weighted sum of the block of the enhancement layer of the reference frame and the block of the base layer of the current frame using the previous weight value. If the mode determination unit 1010 does not set the overriding flag to '1', the reference block generation unit 1030 generates the reference block by means of a weighted sum of the block of the enhancement layer of the reference frame and the block of the base layer of the current frame using the previous weight value.

The encoding unit 1040 performs AR-FGS encoding on a block of the enhancement layer of the current frame using the generated reference block, thereby generating a bitstream.

Figure 11:
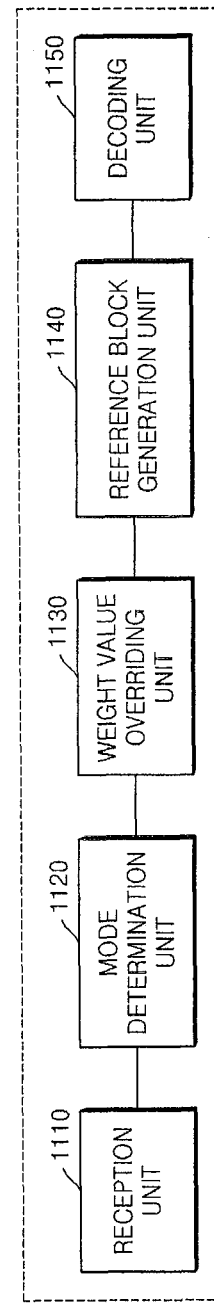
FIG. 11 is a block diagram schematically illustrating the internal structure of a scalable video decoding apparatus according to an exemplary embodiment of the present invention.

FIG. 11 is a block diagram schematically illustrating the internal structure of a scalable video decoding apparatus according to an exemplary embodiment of the present invention. In the following description of FIG. 11, description similar to that of previous embodiments will be omitted.

Referring to FIG. 11, the scalable video decoding apparatus according to the current embodiment of the present invention includes a reception unit 1110, a mode determination unit 1120, a weight value overriding unit 1130, a reference block generation unit 1140, and a decoding unit 1150.

The reception unit 1110 receives a bitstream including a block that has been encoded in a skip mode.

The mode determination unit 1120 determines whether a block of a base layer of a current frame, which corresponds to a block of an enhancement layer of the current frame to be decoded, is in the skip mode. The mode determination unit 1120 also determines whether a flag indicating overriding of a previous weight value with a skip-mode weight value, which will hereinafter be referred to as an overriding flag, has been set in the received bitstream. The mode determination unit 1120 determines whether the block of the base layer is in the skip mode if it confirms that the overriding flag is set to '1', and does not determine whether the block of the base layer is in the skip mode if the overriding flag is not set to '1'.

If the block of the base layer of the current frame is in the skip mode, the weight value overriding unit 1130 extracts the skip-mode weight value from the bitstream and overrides a previous weight value set for a counterpart block of an enhancement layer of a reference frame corresponding to the block of the enhancement layer of the current frame with the extracted skip-mode weight value.

The reference block generation unit 1140 generates a reference block based on a weight value set for the block of the enhancement layer of the reference frame. If the mode determination unit 1120 confirms that the overriding flag is set to '1' and the block of the base layer of the current frame is in the skip mode, the reference block generation unit 1140 generates the reference block by means of a weighted sum of a counterpart block of the enhancement layer of the reference frame to which the skip-mode weight value is applied and the block of the base layer of the current frame to which a weight value calculated from the skip-mode weight value is applied. If the mode determination unit 1120 determines that the block of the base layer of the current frame is not in the skip mode, the reference block generation unit 1140 generates the reference block based on a weighted sum of the counterpart block of the enhancement layer of the reference frame and the block of the base layer of the current frame using the previous weight value. If the mode determination unit 1120 confirms that the overriding flag is not set to '1', the reference block generation unit 1140 generates the reference block by means of a weighted sum of the counterpart block of the enhancement layer of the reference frame and the block of the base layer of the current frame using the previous weight value.

The decoding unit 1150 performs AR-FGS block decoding on the block of the enhancement layer of the current frame using the generated reference block and reconstructs the block.

FIGS. 12 through 15 are graphs for comparing peak signal-to-noise ratio (PSNR) versus bitrate performance of a method for scalable video coding according to exemplary embodiments of the present invention with PSNR versus bitrate performance of a method suggested in JSVM 5.10.

Coding is performed using the syntax applied according to the scalable video coding international standard as illustrated in FIGS. 9A through 9C, the semantics, and the decoding process and a previous weight value parameter "max_diff_ref_scale_for_zero_base_coeff" is fixed to 18/32 for an upper layer. A skip-mode weight value "max_diff_ref_scale_for_zero_base_block" for a base layer is set to 28/32 as expressed as a graph marked with circles, is set to 16/32 as expressed as a graph marked with triangles, and is set to 8/32 as expressed as a graph marked with diamond shapes, for an upper layer.

Figure 12:
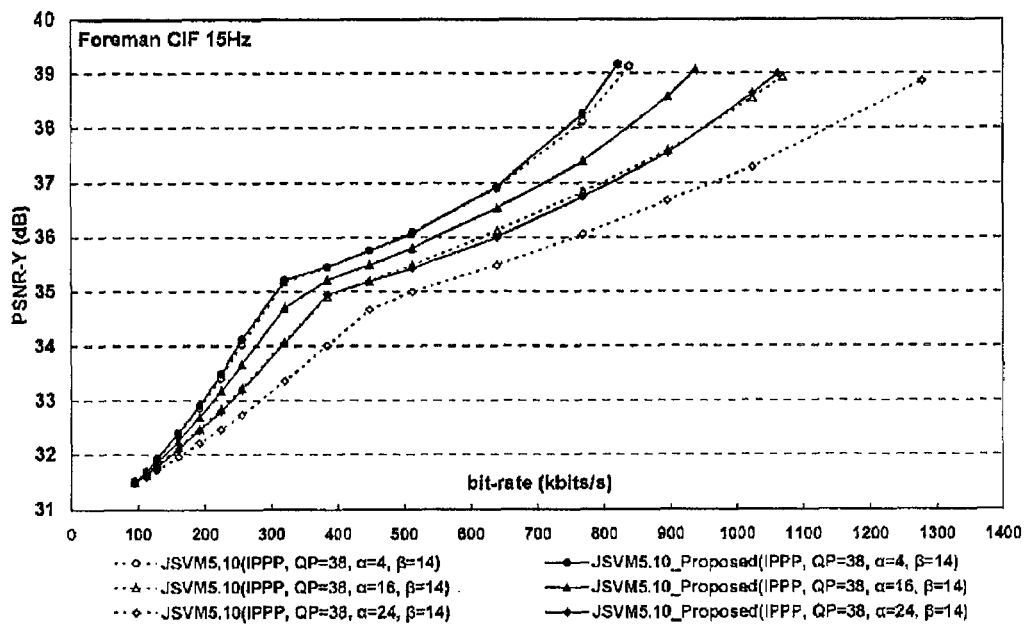
FIG. 12 is a graph for comparing peak signal-to-noise ratio (PSNR) versus bitrate performance of a scalable video encoding method according to a first exemplary embodiment of the present invention with PSNR versus bitrate performance of a method suggested in JSVM 5.10.

Referring to FIG. 12, after a Foreman CIF 15 Hz sequence is coded as "IPPP . . . ", performance comparison is carried out up to 2 FGS layers. When "max_diff_ref_scale_for_z- ero_ base_block" is 28/32, "max_diff_ref_scale_for_ skipped_base_block" is set to 30/32. In the other cases, "max diff_ref_scale_for_skipped_base_block" is set to 32/32. As can be seen from FIG. 14, a performance improvement of up to 0.15 dB is obtained for "max_diff_ref_scale_for_zero_ base_ block"=28/32, a performance improvement of up to 1 dB is obtained for "max_diff_ref_scale_for_zero_base_ block"=16/32, and a performance improvement of up to 1.35 dB is obtained for "max_diff_ref_scale_for_zero_base_ block"=8/32.

Figure 13:
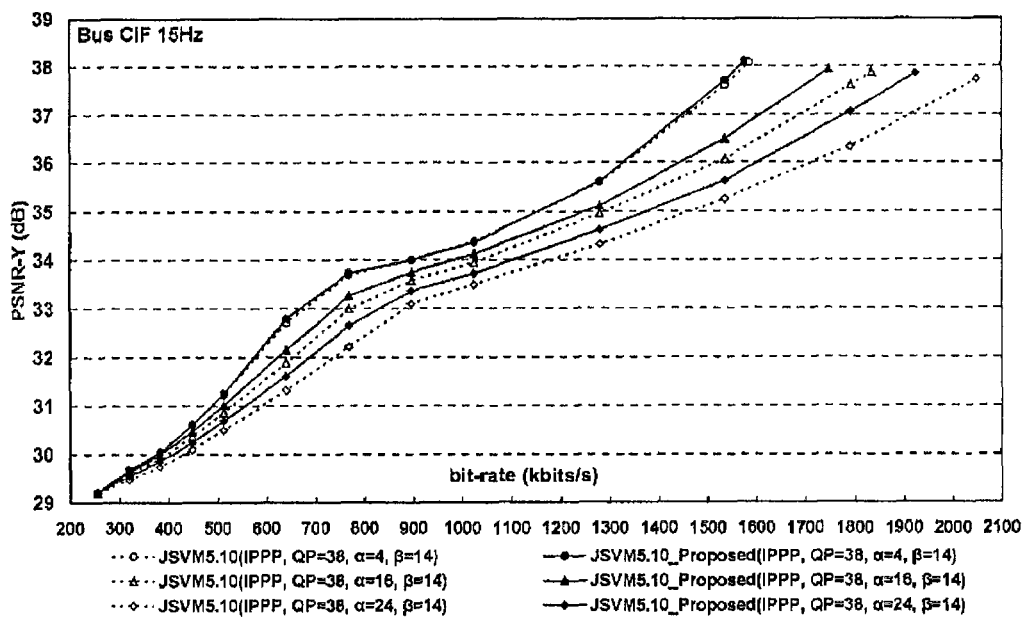
FIG. 13 is a graph for comparing PSNR versus bitrate performance of a scalable video encoding method according to a second exemplary embodiment of the present invention with PSNR versus bitrate performance of the method suggested in JSVM 5.10.

Referring to FIG. 13, after a Bus CIF 15 Hz sequence is coded as "IPPP . . . ", performance comparison is carried out up to 2 FGS layers. When "max_diff_ref_scale_for_zero_ base_block" is 28/32, "max_diff_ref_scale_for_skipped_ base_block" is set to 30/32. In the other cases, "max_diff_ref_ scale_for_skipped_base_block" is set to 32/32. As can be seen from FIG. 15, a performance improvement of up to 0.1 dB is obtained for "max_diff_ref_scale_for_zero_base_ block"=28/32, a performance improvement of up to 0.43 dB is obtained for "max_diff_ref_scale_for_zero_base_ block"=16/32, and a performance improvement of up to 0.73 dB is obtained for "max_diff_ref_scale_for_zero_base_ block"=8/32.

Figure 14:
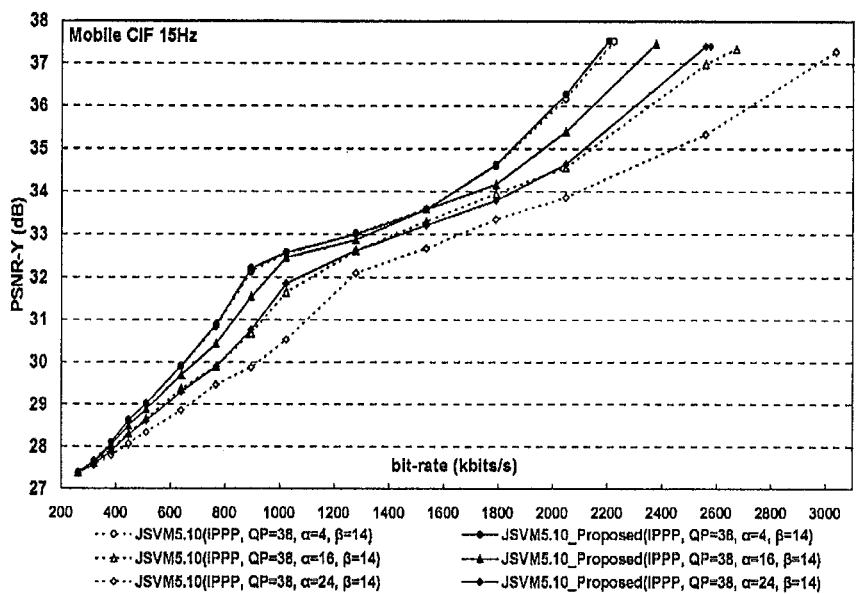
FIG. 14 is a graph for comparing PSNR versus bitrate performance of a scalable video encoding method according to a third exemplary embodiment of the present invention with PSNR versus bitrate performance of the method suggested in JSVM 5.10.

Referring to FIG. 14, after a Mobile CIF 15 Hz sequence is coded as "IPPP . . . ", performance comparison is carried out up to 2 FGS layers. When "max_diff_ref_scale_for_zero_ base_block" is 28/32, "max_diff_ref_scale_for_skipped_ base_block" is set to 29/32. In the other cases, "max_diff_ref_ scale_for_skipped_base_block" is set to 32/32. As can be seen from FIG. 16, a performance improvement of up to 0.09 dB is obtained for "max_diff_ref_scale_for_zero_base_ block"=28/32, a performance improvement of up to 0.84 dB is obtained for "max_diff_ref_scale_for_zero_base_ block"=16/32, and a performance improvement of up to 2.07 dB is obtained for "max_diff_ref_scale_for_zero_base_ block"=8/32.

Figure 15:
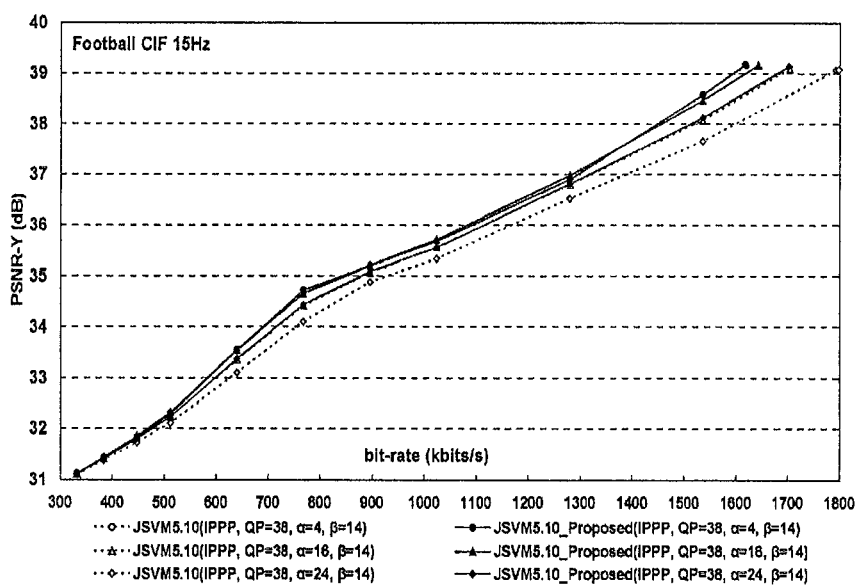
FIG. 15 is a graph for comparing PSNR versus bitrate performance of a scalable video encoding method according to a fourth exemplary embodiment of the present invention with PSNR versus bitrate performance of the method suggested in JSVM 5.10.

Referring to FIG. 15, after a Football CIF 15 Hz sequence is coded as "IPPP . . . ", performance comparison is carried out up to 2 FGS layers. When "max_diff_ref_scale_for_z- ero_ base_block" is 28/32, "max_diff_ref_scale_for_ skipped_base_block" is set to 29/32. In the other cases, "max_diff_ref_scale_for_skipped_base_block" is set to 32/32. As can be seen from FIG. 15, a performance improvement of up to 0.01 dB is obtained for "max_diff_ref_scale_ for_zero_base_block"=28/32, a performance improvement of up to 0.39 dB is obtained for "max_diff_ref_scale_for_z- ero_base_block"=16/32, and a performance improvement of up to 0.47 dB is obtained for "max_diff_ref_scale_for_zero_ base_block"=8/32.

As described above, scalable video coding efficiency can be improved by an encoding/decoding method and apparatus to which a method of generating a reference block according to the present invention is applied While the scalable video encoding/decoding method has been described as being implemented in units of a macrob- lock or a block, it can be easily predicted by those of ordinary skill in the art that the present invention can also be applied to a scalable video encoding/decoding method implemented in units of a slice or a frame.

Although an FGS layer is a single layer in the foregoing description, it can also be easily predicted by those of ordi- nary skill in the art that the present invention can also be applied to a case where there are two FGS layers or more.

Meanwhile, the present invention can be embodied as code that is readable by a computer on a computer-readable record- ing medium. The computer-readable recording medium includes all kinds of recording devices storing data that is readable by a computer system. Examples of the computer- readable recording medium include read-only memory (ROM), random access memory (RAM), CD-ROMs, mag- netic tapes, floppy disks, optical data storage devices, and carrier waves such as transmission over the Internet. The computer readable recording medium can also be distributed over network coupled computer systems so that the computer readable code is stored and executed in a distributed fashion. Also, functional programs, code, and code segments for implementing the present invention can be easily construed by programmers skilled in the art.

While the present invention has been particularly shown and described with reference to exemplary embodiments thereof, it will be understood by those of ordinary skill in the art that various changes in form and detail may be made therein without departing from the spirit and scope of the present invention as defined by the following claims.

The invention claimed is:

1. A scalable video encoding method, comprising:
    (a) determining whether a block of a base layer, which corresponds to a block of an enhancement layer of a current frame to be encoded, is in a skip mode only by determining whether block data of the base layer is the same as block data of a reference frame base layer in the temporal direction;
    (b) overriding a previous weight value that has been set for a block of an enhancement layer of a reference frame with a new weight value, the block of the enhancement layer of the reference frame corresponding to the block of the enhancement layer of the current frame, whenever block data of the base layer is the same as the block data of the reference frame base layer in the temporal direc- tion; and
    (c) generating a reference block for the block of the enhancement layer of the current frame based on the block of the enhancement layer of the reference frame and the block of the base layer of the current frame using the new weight value.

2. The scalable video encoding method of claim 1, further comprising performing adaptive reference fine grain scalabil- ity (AR-FGS) encoding on the block of the enhancement layer of the current frame based on the generated reference block.

3. The scalable video encoding method of claim 1, wherein the new weight value is set greater than the previous weight value in order to improve the rate of the use of block data of the enhancement layer of the reference frame.

4. The scalable video encoding method of claim 1, wherein (c) comprises generating the reference block by means of a weighted sum of the block of the enhancement layer of the reference frame to which the new weight value is applied and the block of the base layer of the current frame to which a weight value calculated from the new weight value is applied.

5. The scalable video encoding method of claim 1, further comprising (d) generating the reference block based on the block of the enhancement layer of the reference frame and the block of the base layer of the current frame using the previous weight value if the block of the base layer of the current frame is not in the skip mode.

6. The scalable video encoding method of claim 1, wherein (a) comprises:
    (a1) determining whether to set a flag indicating overriding of a previous weight value with a new weight value; and
    (a2) determining whether the block of the base layer of the current frame is in the skip mode if the flag is set.

7. The scalable video encoding method of claim 6, further comprising (e) generating the reference block based on the block of the enhancement layer of the reference frame and the block of the base layer of the current frame using the previous weight value if the flag is not set.

8. The scalable video encoding method of claim 1, wherein the new weight value is set to have a fixed length of predetermined bits or a variable length, together with the previous weight value, in a slice header.

9. The scalable video encoding method of claim 1 wherein the new weight value is not dependent upon characteristic information of the enhancement layer of the current frame.

10. A scalable video decoding method, comprising:
    (a) determining whether a block of a base layer, which corresponds to a block of an enhancement layer of a current frame to be decoded, is in a skip mode only by determining whether block data of the base layer is the same as block data of a reference frame base layer in the temporal direction;
    (b) overriding a previous weight value that has been set for a block of an enhancement layer of a reference frame with a new weight value, the block of the enhancement layer of the reference frame corresponding to the block of the enhancement layer of the current frame, in direct response to determining that the block of the base layer is in the skip mode, wherein the new weight value is determined based on whether the block of the base layer is in the skip mode; and
    (c) generating a reference block for the block of the enhancement layer of the current frame based on the block of the enhancement layer of the reference frame and the block of the base layer of the current frame using the new weight value.

11. The scalable video decoding method of claim 10, further comprising performing adaptive reference fine grain scalability (AR-FGS) decoding on the block of the enhancement layer of the current frame based on the generated reference block.

12. The scalable video decoding method of claim 10, wherein the new weight value is set greater than the previous weight value in order to improve the rate of the use of block data of the enhancement layer of the reference frame.

13. The scalable video decoding method of claim 10, wherein (b) comprises:
    (b1) extracting the new weight value included in the bitstream; and
    (b2) overriding the previous weight value set for the block of the enhancement layer of the reference frame with the new weight value.

14. The scalable video decoding method of claim 13, wherein the new weight value is extracted from a slice header included in the bitstream.

15. The scalable video decoding method of claim 10, wherein (c) comprises generating the reference block for the block of the enhancement layer of the current frame by means of a weighted sum of the block of the enhancement layer of the reference frame to which the new weight value is applied and the block of the base layer of the current frame to which a weight value calculated from the new weight value is applied.

16. The scalable video decoding method of claim 10, further comprising (d) generating the reference block based on the block of the enhancement layer of the reference frame and the block of the base layer of the current frame using the previous weight value if the block of the base layer of the current frame is not in the skip mode.

17. The scalable video decoding method of claim 10, wherein (a) comprises:

(a1) determining whether a flag indicating overriding of a previous weight value with a new weight value has been set; and (a2) determining whether the block of the base layer of the current frame is in the skip mode if the flag has been set.

18. The scalable video decoding method of claim 17, further comprising (f) generating the reference block based on the block of the enhancement layer of the reference frame and the block of the base layer of the current frame using the previous weight value if the flag has not been set.

19. The scalable video decoding method of claim 10 wherein the previous weight value is overridden whenever block data of the base layer is the same as the block data of the reference frame base layer in the temporal direction.

20. A scalable video encoding apparatus, comprising:
    a mode determination unit determining whether a block of a base layer, which corresponds to a block of an enhancement layer of a current frame to be encoded, is in a skip mode only by determining whether block data of the base layer is the same as block data of a reference frame base layer in the temporal direction;
    a weight value overriding unit overriding a previous weight value that has been set for a block of an enhancement layer of a reference frame with a new weight value, the block of the enhancement layer of the reference frame corresponding to the block of the enhancement layer of the current frame, whenever block data of the base layer is the same as the block data of the reference frame base layer in the temporal direction; and
    a reference block generation unit generating a reference block for the block of the enhancement layer of the current frame based on the block of the enhancement layer of the reference frame and the block of the base layer of the current frame using the new weight value.

21. The scalable video encoding apparatus of claim 20, further comprising an encoding unit performing adaptive reference fine grain scalability (AR-FGS) encoding on the block of the enhancement layer of the current frame based on the generated reference block.

22. The scalable video encoding apparatus of claim 20, wherein the new weight value is set greater than the previous weight value in order to improve the rate of the use of block data of the enhancement layer of the reference frame.

23. The scalable video encoding apparatus of claim 20, wherein the reference block generation unit generates the reference block by means of a weighted sum of the block of the enhancement layer of the reference frame to which the new weight value is applied and the block of the base layer of the current frame to which a weight value calculated from the new weight value is applied.

24. The scalable video encoding apparatus of claim 20, wherein the reference block generation unit generates the reference block based on the block of the enhancement layer of the reference frame and the block of the base layer of the current frame using the previous weight value if the block of the base layer of the current frame is not in the skip mode.

25. The scalable video encoding apparatus of claim 20, wherein the mode determination unit determines whether to set a flag indicating overriding of a previous weight value with a new weight value and determines whether the block of the base layer of the current frame is in the skip mode if the flag has been set.

26. The scalable video encoding apparatus of claim 25, wherein the reference block generation unit generates the reference block based on the block of the enhancement layer of the reference frame and the block of the base layer of the current frame using the previous weight value if the flag has not been set.

27. A scalable video decoding apparatus comprising:
- a mode determination unit determining whether a block of a base layer, which corresponds to a block of an enhancement layer of a current frame to be decoded, is in a skip mode only by determining whether block data of the base layer is the same as block data of a reference frame base layer in the temporal direction;
- a weight value overriding unit overriding a previous weight value that has been set for a block of an enhancement layer of a reference frame with a new weight value, the block of the enhancement layer of the reference frame corresponding to the block of the enhancement layer of the current frame, in direct response to determining that the block of the base layer is in the skip mode, wherein the new weight value is determined based on whether the block of the base layer is in the skip mode; and
- a reference block generation unit generating a reference block for the block of the enhancement layer of the current frame based on the block of the enhancement layer of the reference frame and the block of the base layer of the current frame using the new weight value.

28. The scalable video decoding apparatus of claim 27, further comprising a decoding unit performing adaptive reference fine grain scalability (AR-FGS) decoding on the block of the enhancement layer of the current frame based on the generated reference block.

29. The scalable video decoding apparatus of claim 27, wherein the new weight value is greater than the previous weight value in order to improve the rate of the use of block data of the enhancement layer of the reference frame.

30. The scalable video decoding apparatus of claim 27, wherein the weight value overriding unit extracts the new weight value included in the bitstream and overrides the previous weight value of the block of the enhancement layer of the reference frame with the new weight value.

31. The scalable video decoding apparatus of claim 27, wherein the reference block generation unit generates the reference block for the block of the enhancement layer of the current frame by means of a weighted sum of the block of the enhancement layer of the reference frame to which the new weight value is applied and the block of the base layer of the current frame to which a weight value calculated from the new weight value is applied.

32. The scalable video decoding apparatus of claim 27, wherein the reference block generation unit generates the reference block based on the block of the enhancement layer of the reference frame and the block of the base layer of the current frame using the previous weight value if the block of the base layer of the current frame is not in the skip mode.

33. The scalable video decoding apparatus of claim 27, wherein the mode determination unit determines whether a flag indicating overriding of a previous weight value with a new weight value has been set and determines whether the block of the base layer of the current frame is in the skip mode if the flag has been set.

34. The scalable video decoding apparatus of claim 33, wherein the reference block generation unit generates the reference block based on the block of the enhancement layer of the reference frame and the block of the base layer of the current frame using the previous weight value if the flag has not been set.

35. A non-transitory computer-readable medium having embodied thereon a program for executing the method as recited in any one of claims 1 through 18.

* * * * *